July 20, 1926.
G. H. BUCHANAN
1,593,385
RUBBER ACCELERATOR AND METHOD OF MAKING THE SAME
Filed March 1, 1926
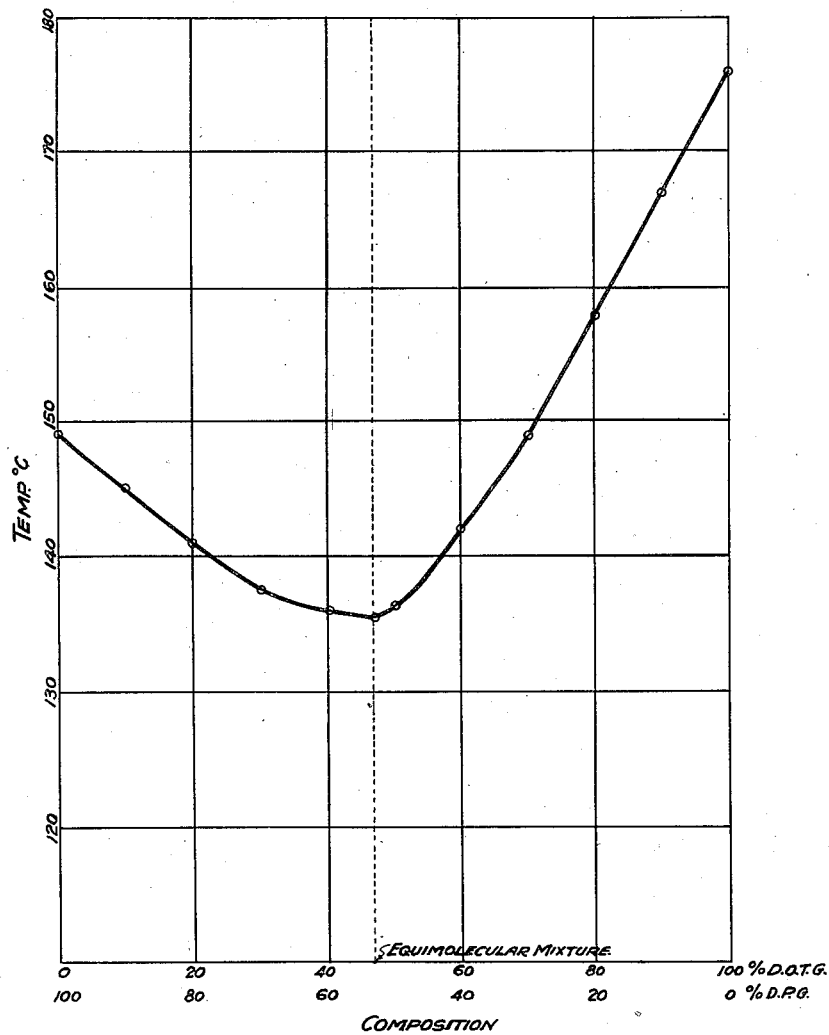
GUY H. BUCHANAN.   INVENTOR.
BY
ATTORNEY.

Patented July 20, 1926.

1,593,385

UNITED STATES PATENT OFFICE.

GUY H. BUCHANAN, OF WESTFIELD, NEW JERSEY, ASSIGNOR TO AMERICAN CYANAMID COMPANY, OF NEW YORK, N. Y., A CORPORATION OF MAINE.

RUBBER ACCELERATOR AND METHOD OF MAKING THE SAME.

Application filed March 1, 1926. Serial No. 91,356.

This invention relates to the production of rubber accelerators, more particularly to accelerators of the guanidine type, such as the di-substituted guanidines.

It is among the objects of this invention to produce a composition of the di-substituted guanidine type and to devise a method of making the same which shall be highly effective in the vulcanization of rubber and which shall be easy and inexpensive to make.

In the vulcanization of rubber for certain large uses, such as for automobile tires, it is very desirable and even necessary that the rubber compound have a high degree of flexibility and great strength. To cause curing or vulcanization to take place within a reasonable length of time it is necessary to add to the mixture a composition which accelerates the vulcanization, and among such compositions are the di-substituted guanidines, which have been found to be particularly effective for this application. Diphenylguanidine is very commonly used with good results, although the melting point thereof is a little too high for the best working conditions in compounding the rubber mixture. Diorthotolylguanidine is considerably superior to diphenylguanidine in its accelerating value and is also in extensive use. However, it suffers from two serious disadvantages; first, the melting point thereof is considerably higher than that of diphenylguanidine, and second, the cost thereof is also considerably higher than the cost of diphenylguanidine because of the higher initial cost of the orthotoluidine as compared with the aniline, the greater difficulty of operating the process of manufacture, and the lower yields obtained.

The present invention is designed to obviate the disadvantages of high cost and high melting point of diorthotolylguanidine and to produce a rubber accelerator which has a high degree of activity and which may be readily incorporated and uniformly distributed in the rubber mixture.

In practicing my invention I conducted a series of experiments with mixtures of diphenylguanidine and diorthotolylguanidine as the result of which I concluded that mixtures thereof may be made, the melting points of which are lower than the melting point of the constituent which is present in preponderating amount and some mixtures may have melting points lower than the melting point of the more readily fusible constituent. I further found that a eutectic mixture is formed, which has a melting point of about 135° C. compared to 149° C. for diphenylguanidine, and 178° V. for diorthotolylguanidine, and that this eutectic mixture corresponds to a mixture of equimolecular proportions of the two constituents.

In the accompanying drawing constituting a part hereof, the single figure is a diagram showing the effect on the melting point of each constituent produced by the addition of varying amounts of the other constituent.

The general procedure which I followed was to weight out 2 gram samples containing the amounts of the pure diphenylguanidine (D. P. G.) and diorthotolylguanidine (D. O. T. G.) for each of the various mixtures tried, then dissolved the same in 75 cc. of water containing 1 cc. concentrated hydrochloric acid and precipitated from the solution by pouring slowly into 25 cc. of water containing a slight excess of sodium hydroxide. The precipitates were filtered, washed and dried, and the melting points determined. The following table shows the melting points of various mixtures used, the data being incorporated in the curve of the drawing.

| % D. P. G. | % D. O. T. G. | Fusion Temp. °C. |
|---|---|---|
| 100 | 0 | 149.0 |
| 90 | 10 | 145.0 |
| 80 | 20 | 141.0 |
| 70 | 30 | 137.5 |
| 60 | 40 | 136.0 |
| 50 | 50 | 136.5 |
| 40 | 60 | 142.0 |
| 30 | 70 | 149.0 |
| 20 | 80 | 158.0 |
| 10 | 90 | 167.5 |
| 0 | 100 | 178.0 |
| (Equimolecular) 47 | 53 | 135.5 |

It was found that the lowering of the melting point of each pure substance by the other is a progressive relation which, when graphically represented, gives two smooth curves which converge at the eutectic point. The noteworthy feature of this phenomenon is that the eutectic point is obtained with an equimolecular mixture of the two constituents, about 47% diphenylguanidine and 53% diorthotolylguanidine. The formation of a eutectic is proof of the fact that the two substances are not chemically combined and this is further shown by repeated recrystallizations of the eutectic from ethyl alcohol which caused a gradual separation of the constituents and a raising of the melting point.

When I determined the effect of mixtures of approximately the eutectic composition upon the vulcanizing properties of rubber mixtures I discovered that the eutectic mixture approximated the activity of the the diorthotolylguanidine which is considerably more active than diphenylguanidine. This was an unexpected result because it might have been anticipated that the mixture would exhibit properties intermediate between diphenylguanidine and diorthotolylguanidine. Whether this property is in some way related to the lower melting point I do not know, but the facts themselves are shown by the following data:

| Elongation per cent. | Pounds per square inch | |
|---|---|---|
| | D. O. T. G. | Eutectic mixture |
| 100 | 76 | 72 |
| 200 | 117 | 119 |
| 300 | 193 | 187 |
| 400 | 304 | 303 |
| 500 | 525 | 528 |
| 600 | 975 | 995 |
| 700 | 1880 | 1980 |
| Break {Tension | 2980 | 3140 |
| {Elong. per cent | 780 | 780 |

The standard formula:

Parts by Wgt.
Smoked ribbed sheet _____ 100
Zinc oxide _____ 5
Accelerator _____ 0.375
Sulphur _____ 3.5 was identical with that being used for accelerated aging tests. All mixings were compounded under as similar conditions as it was possible to obtain. Two sheets of each mixing were vulcanized simultaneously at 288° F. for 60 minutes.

The cost of the eutectic mixture is about midway between the cost of the constituents, the activity is about as great as that of diorthotolylguanidine and the melting point is below that of diphenylguanidine. Although I have described the invention giving diorthotolylguanidine as an example, it is equally feasible to use the meta or para modifications or mixtures thereof in place of the ortho. The intimate mixture of the constituents may be obtained in other ways than by precipitation from solutions, such as by mechanical mixing or grinding together thereof. These and other changes may be made in my invention, the scope of which is defined in the claims annexed hereto.

What I claim is:—

1. A rubber accelerator comprising a mixture of diphenylguanidine and ditolylguanidine.

2. A rubber accelerator comprising a mixture of diphenylguanidine and ditolylguanidine, the melting point of said mixture being lower than the melting point of the major constituent.

3. A rubber accelerator comprising a mixture of diphenylguanidine and ditolylguanidine, the melting point of said mixture being lower than the melting point of either constituent.

4. A rubber accelerator comprising a mixture of diphenylguanidine and ditolylguanidine, and having an accelerating value approximately equal to that of ditolylguanidine.

5. A rubber accelerator comprising a mixture of diphenylguanidine and ditolylguanidine, the proportions of the constituents being from 40% to 60% of diphenylguanidine and 60% to 40% of ditolylguanidine.

6. A rubber accelerator comprising an approximately equimolecular mixture of diphenylguanidine and ditolylguanidine.

7. A rubber accelerator comprising an approximately equimolecular mixture of diphenylguanidine and ditolylguanidine, having a melting point about 135° C.

8. A method of making a rubber accelerator which comprises making a solution containing diphenylguanidine and ditolylguanidine, and precipitating the same.

9. A method of making a rubber accelerator which comprises making a solution containing salts of diphenylguanidine and ditolylguanidine, and precipitating the same.

10. A method of making a rubber accelerator which comprises making a solution containing salts of diphenylguanidine and ditolylguanidine, and precipitating the same with an alkali.

In testimony whereof, I have hereunto subscribed my name this 26th day of February, 1926.

GUY H. BUCHANAN.